United States Patent
Choi et al.

(10) Patent No.: US 9,913,274 B2
(45) Date of Patent: Mar. 6, 2018

(54) APPARATUS AND METHOD FOR ALLOCATING RESOURCES IN WIRELESS COMMUNICATION SYSTEM

(71) Applicant: Samsung Electronics Co., Ltd., Gyeonggi-do (KR)

(72) Inventors: Yun-Seok Choi, Daejeon (KR); Hee-Won Kang, Gyeonggi-do (KR); Keun-Chul Hwang, Gyeonggi-do (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 296 days.

(21) Appl. No.: 14/540,931

(22) Filed: Nov. 13, 2014

(65) Prior Publication Data

US 2015/0131452 A1    May 14, 2015

(30) Foreign Application Priority Data

Nov. 13, 2013 (KR) .................. 10-2013-0137710

(51) Int. Cl.
*H04W 72/04* (2009.01)
*H04W 72/08* (2009.01)
*H04W 52/14* (2009.01)
*H04L 25/02* (2006.01)
*H04W 52/40* (2009.01)
*H04W 52/04* (2009.01)
*H04W 52/32* (2009.01)

(52) U.S. Cl.
CPC ..... *H04W 72/0446* (2013.01); *H04L 25/0202* (2013.01); *H04L 25/0228* (2013.01); *H04W 52/04* (2013.01); *H04W 52/146* (2013.01); *H04W 52/322* (2013.01); *H04W 52/40* (2013.01); *H04W 72/0473* (2013.01); *H04W 72/085* (2013.01)

(58) Field of Classification Search
CPC ......... H04W 72/0446; H04W 72/0473; H04W 72/085; H04W 52/146; H04W 52/322; H04W 52/04; H04W 52/40; H04L 25/0228; H04L 25/0202; H04L 12/5693; H04L 47/24; H04L 47/125; H04L 49/3027

See application file for complete search history.

(56) References Cited

U.S. PATENT DOCUMENTS

| | | | | |
|---|---|---|---|---|
| 7,573,851 | B2* | 8/2009 | Xing | H04B 7/0613 370/332 |
| 7,778,224 | B2* | 8/2010 | Hayashi | H04B 7/2643 370/335 |
| 8,094,571 | B2* | 1/2012 | Gaal | H04B 17/309 370/252 |
| 8,219,036 | B2* | 7/2012 | Terry | H04L 1/0009 370/329 |
| 8,228,934 | B2* | 7/2012 | Jeong | H04W 40/32 370/337 |

(Continued)

*Primary Examiner* — Brian O'Connor

(57) ABSTRACT

An apparatus and a method are provided for allocating resources, in which a base station allocates a time slot to a terminal in a wireless communication system supporting a time division multiple access scheme. The method includes a monitoring block of monitoring a channel state of the terminal after allocating a time slot for the terminal. The method also includes adjusting, by increasing or reducing, the number of the existing allocated time slots when the channel state of the terminal satisfies a preset time slot adjustment requirement.

20 Claims, 5 Drawing Sheets

(56) References Cited

U.S. PATENT DOCUMENTS

| | | | | |
|---|---|---|---|---|
| 8,477,746 B2* | 7/2013 | Nanba | | H04J 3/00 370/336 |
| 8,755,324 B2* | 6/2014 | Yu | | H04W 72/085 370/315 |
| 8,942,192 B2* | 1/2015 | Damnjanovic | | H04W 72/04 370/329 |
| 9,357,499 B2* | 5/2016 | Yu | | H04W 52/04 |
| 9,456,429 B2* | 9/2016 | Ouchi | | H04W 72/12 |
| 2005/0002349 A1* | 1/2005 | Hayashi | | H04B 7/2643 370/320 |
| 2007/0291702 A1* | 12/2007 | Nanba | | H04J 3/00 370/336 |
| 2008/0212543 A1* | 9/2008 | Ban | | H04L 5/0007 370/336 |
| 2008/0285490 A1* | 11/2008 | Mukai | | H04L 5/0007 370/280 |
| 2011/0136534 A1* | 6/2011 | Nanba | | H04J 3/00 455/522 |
| 2011/0176515 A1* | 7/2011 | Son | | H04W 36/26 370/332 |
| 2012/0230292 A1* | 9/2012 | Nanba | | H04J 3/00 370/330 |
| 2013/0344911 A1* | 12/2013 | Yu | | H04W 52/04 455/521 |
| 2014/0043996 A1* | 2/2014 | Terry | | H04L 1/0001 370/252 |
| 2014/0105193 A1* | 4/2014 | Bjorken | | H04W 72/1268 370/336 |
| 2014/0194136 A1* | 7/2014 | Terry | | H04W 52/146 455/452.2 |
| 2014/0269571 A1* | 9/2014 | Proctor, Jr. | | H04B 7/2618 370/329 |
| 2015/0071263 A1* | 3/2015 | Yang | | H04W 24/10 370/336 |
| 2016/0150490 A1* | 5/2016 | Ouchi | | H04W 72/12 455/522 |
| 2016/0165545 A1* | 6/2016 | Ouchi | | H04W 52/146 455/522 |

* cited by examiner

APPARATUS AND METHOD FOR ALLOCATING RESOURCES IN WIRELESS COMMUNICATION SYSTEM

CROSS-REFERENCE TO RELATED APPLICATION(S) AND CLAIM OF PRIORITY

The present application is related to and claims the priority under 35 U.S.C. § 119(a) to Korean Application Serial No. 10-2013-0137710, which was filed in the Korean Intellectual Property Office on Nov. 13, 2013, the entire content of which is hereby incorporated by reference.

TECHNICAL FIELD

The present disclosure relates to an apparatus and a method for allocating resources, in which a base station allocates a time slot to a terminal in a wireless communication system supporting a time division multiple access scheme.

BACKGROUND

In a mobile communication system, a base station allocates resources to terminals located in a service area of the base station. There may be various resources allocated by the base station. For example, the base station may allocate frequency resources to the terminals. The type of resource that the base station allocates to a terminal may be determined according to a communication scheme supported by the mobile communication system.

In the example of a mobile communication system (hereinafter referred to as a "TDMA system") supporting a Time Division Multiple Access (TDMA) scheme, a base station may allocate time-type resources to terminals. The time-type resources may be uplink/downlink (UL/DL) time slots. In this embodiment, a terminal transmits data to the base station in a time slot allocated for UL (hereinafter referred to as a "UL time slot"), and receives data from the base station in a time slot allocated for DL (hereinafter referred to as a "DL time slot").

In the example of a mobile communication system (hereinafter referred to as an "FDMA system") supporting a Frequency Division Multiple Access (FDMA) scheme, a base station may allocate frequency-type resources to terminals. The frequency-type resources may be UL/DL frequency bands. In this embodiment, a terminal transmits data to the base station in a frequency band allocated for UL (hereinafter referred to as a "UL frequency band"), and receives data from the base station in a frequency band allocated for DL (hereinafter referred to as a "DL frequency band").

In the mobile communication system, the base station may not discriminatively but equitably allocate resources to the terminals. For example, in the example of the TDMA system, the base station allocates an identical number of time slots to each of all the terminals.

SUMMARY

In a mobile communication system, terminals that receive communication services from one base station may have different communication environments, due to a distance between the one base station and each of the terminals, a geographical feature therebetween, interference, and the like. Also, the terminals may have respective data which are received from the one base station and are different in type, size, and the like according to respective services to be used by the terminals.

In this embodiment, the base station supports the discriminative allocation of resources to the terminals in view of a communication environment, a service, and the like.

To address the above-discussed deficiencies, it is a primary object to provide an apparatus and a method in which a base station allocates resources to terminals in view of respective communication environments of the terminals in a TDMA system.

Another aspect of the present disclosure is to provide an apparatus and a method for allocating resources, in which, in a TDMA system, a base station monitors a channel quality change of each terminal and adjusts the number of time slots to be allocated based on the channel quality change according to the monitoring.

Still another aspect of the present disclosure is to provide an apparatus and a method for allocating resources, in which, in a TDMA system, a base station performs the initial allocation and reallocation of resources in view of a transmission power change amount of each terminal equivalent to a multislot power profile supported by each terminal.

In accordance with an aspect of the present disclosure, a method is provided for allocating a time slot to a terminal by a base station of a wireless communication system supporting a time division multiple access scheme. The method includes a monitoring block of monitoring a channel state of the terminal after allocating a time slot for the terminal. The method also includes adjusting, by increasing or reducing, the number of the existing allocated time slots when the channel state of the terminal satisfies a preset time slot adjustment requirement.

In accordance with another aspect of the present disclosure, a base station is provided for allocating a time slot to a terminal in a wireless communication system supporting a time division multiple access scheme. The base station includes a receiver that receives a signal from the terminal in a time slot allocated to the terminal. The base station also includes a controller that monitors a channel state of the terminal after allocating the time slot for the terminal, and increases or reduces the number of the existing allocated time slots when the channel state of the terminal satisfies a preset time slot adjustment requirement.

According to embodiments of the present disclosure, the base station changes the allocated resource in view of a channel state change of each terminal, and thereby enables a service to be provided to each terminal by using an optimal resource.

In accordance with another aspect of the present disclosure, a wireless communication system supporting a time division multiple access scheme is provided for allocating a time slot to a terminal. The wireless communication system includes a base station comprising a transceiver configured to receive a signal from the terminal in a time slot allocated to the terminal. The wireless communication system also includes one or more processors configured to monitor a channel state of the terminal after allocating the time slot for the terminal, and increases or reduces a number of existing allocated time slots when the channel state of the terminal satisfies a preset time slot adjustment requirement Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. Hereinafter, the detailed description described below will present representative embodiments of the present disclosure in order to solve the foregoing technical problems. Further, the same names of entities defined for the convenience of descriptions of the present disclosure may be used. However, the names used for the convenience of the descriptions do not limit the scope of the present disclosure, and may be applied to a system having a similar technical background through the same or easy modification.

A TDMA system may define a unit of transmission by using a time slot. An example of the TDMA system is a Global System for Mobile Communication (GSM) system.

The GSM system is one of second generation (2G) mobile communication technologies which are widely used all over the world, including Europe.

The GSM system employs a multiple access scheme, and uses a TDMA scheme mixed with an FDMA scheme. Due to the use of the TDMA scheme mixed with the FDMA scheme, examples of a physical channel in the GSM system may include a channel at a carrier frequency and a channel in a time slot.

Figure 1:
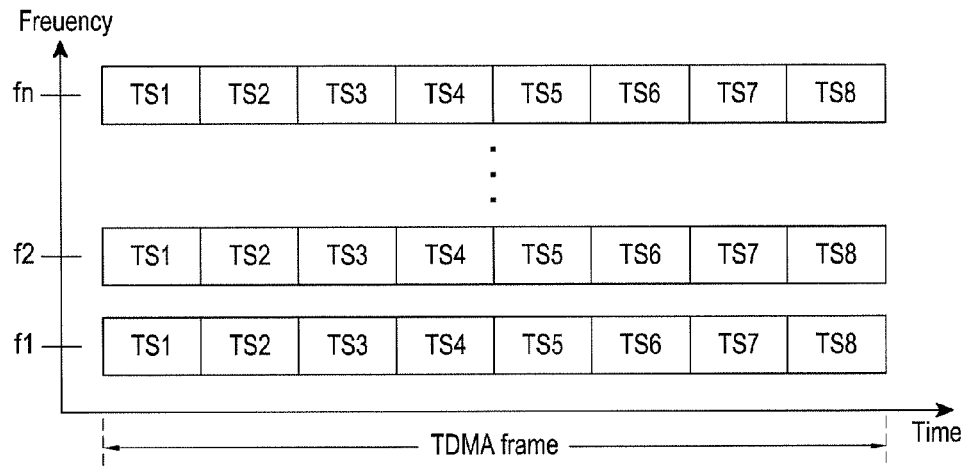
FIG. 1 illustrates an example of resource allocation in a GSM system.

FIG. 1 illustrates an example of resource allocation in a GSM system.

Referring to FIG. 1, resources in the GSM system are divided into frequency resources and time resources. The frequency resources are carrier frequency bands, and the time resources are Time Slots (TSs). For example, an entire carrier frequency band may include an n number of carrier frequency bands f1, f2, . . . , and fn, each having a bandwidth of 200 kHz. A TDMA frame in each of the n number of carrier frequency bands may include 8 time slots TS1, TS2, TS3, . . . , and TS8.

In this embodiment, a base station allocates, to each terminal, at least one carrier frequency band and at least one of time slots included in a TDMA frame in the at least one carrier frequency band.

General Packet Radio Service (GPRS) and Enhanced Data Rates for GSM Evolution (EDGE) prescribe that multiple time slots can be allocated to one terminal. The multiple time slots refer to a plurality of time slots allocated to the one terminal. The GPRS and the EDGE can provide a more improved data transmission capability (e.g., a data transmission speed) than that of the GSM system.

To this end, when the base station allocates a time slot to each terminal, the base station may consider a communication environment of each terminal. The communication environment may be regarded as a channel characteristic that each terminal has. For example, a channel characteristic in wireless communication may be representative of a distance between the base station and each terminal, a geographical feature of an area in which each terminal is located, interference, and the like. In the following description, for convenience of description, the term "channel characteristic" will be consistently used.

According to an embodiment of the present disclosure, when all terminals use an identical service, a base station may allocate a smaller number of time slots to a terminal having a poor channel characteristic than the number of time slots allocated to a terminal having a good channel characteristic. For example, when the maximum number of allocable time slots is equal to 4, the base station allocates 4 time slots to a terminal, of which a channel characteristic belongs to a highest level, and allocates one time slot to a terminal, of which a channel characteristic belongs to a lowest level. The base station may allocate 2 or 3 time slots to a terminal, of which a channel characteristic belongs to a level between the highest level and the lowest level.

According to an embodiment of the present disclosure, the base station may allocate a resource in view of the type of service (or the type of content) which is being provided or is to be provided to the relevant terminal. Types of services (or types of pieces of content) may be divided into voice, a photograph, a moving image, and the like. For example, the base station may allocate a larger number of time slots for content requiring a high transmission rate than the number of time slots allocated for content requiring a low transmission rate.

The base station may determine the number of time slots to be allocated to each terminal, in view of a channel characteristic of each terminal together with the type of service to be provided to each terminal.

As described above, the base station may respectively allocate 8 time slots to a maximum of 8 users in each of carrier frequency bands f1, f2, . . . , and fn. Alternatively, the base station may allocate all the 8 time slots to at least one user in each of carrier frequency bands f1, f2, . . . , and fn. In this embodiment, a terminal allocated the 8 time slots is capable of obtaining a transmission speed which is 8 times faster than a terminal allocated one time slot.

When the base station allocates multiple time slots to one terminal, adjust maximum transmission power of the relevant terminal. This is because transmission power of the relevant terminal allocated the multiple time slots is likely to act as severe interference to neighboring terminals.

Table 1 below shows an example of defining a desired maximum output power reduction value which is matched to the number of allocated time slots.

TABLE 1

| The number of TSs allocated to UL | Maximum output power reduction value (dB) |
| --- | --- |
| 1 | 0 |
| 2 | 3.0 |
| 3 | 4.8 |
| 4 | 6.0 |
| 5 | 7.0 |
| 6 | 7.8 |
| 7 | 8.5 |
| 8 | 9.0 |

In Table 1, a maximum output power reduction value defines a reduction degree from maximum transmission power of a relevant terminal in view of the number of allocated time slots. For example, transmission power of a terminal which has a maximum output power reduction value of 0 dB and is allocated one time slot, may be determined as maximum transmission power of the terminal. Transmission power of a terminal which has a maximum output power reduction value of 6.0 dB and is allocated 4 time slots, may be determined as power obtained by reducing maximum transmission power of the terminal by 6.0 dB.

Rel.5 which is a next-generation mobile communication standard defines a range of maximum transmission power for each MultiSlot Power Profile (MSPP) as in Table 2 below.

TABLE 2 a ≤ MS maximum output power ≤ min(MAX_PWR, a + b)
a = min (MAX_PWR, MAX_PWR +
XXX_MULTISLOT_POWER_PROFILE − 10log(n));
MAX_PWR equals to the MS maximum output power according to the relevant power class;
XXX_MULTISLOT_POWER_PROFILE refers either to
GMSK_MULTISLOT_POWER
PROFILE or 8-PSK_MULTISLOT_POWER_PROFILE depending on the modulation type concerned, and
XXX_MULTISLOT_POWER_PROFILE 0 = 0 dB;
XXX_MULTISLOT_POWER_PROFILE 1 = 2 dB;
XXX_MULTISLOT_POWER_PROFILE 2 = 4 dB;
XXX_MULTISLOT_POWER_PROFILE 3 = 6 dB.
For DCS 1800 and PCS 1900 frequency bands b = 3 dB, for all other bands b = 2 dB.

As shown in Table 2, 4 MSPPs are defined in each of Gaussian Minimum Shift Keying (GMSK) and 8 Phase Shift Keying (8PSK) modulation schemes, and terminals are prescribed as having different ranges of maximum transmission power according to MSPPs supported by the terminals. For example, transmission power of a terminal which has an MSPP equal to "0" and is allocated an n number of time slots is determined as power obtained by reducing maximum transmission power by 10*log 10(n) [dB].

Table 3 below shows an example in which a minimum value of transmission power matched to the number of allocated time slots is defined in Rel.5 which is the next-generation mobile communication standard.

TABLE 3

| | The number of allocated TSs | | | |
| --- | --- | --- | --- | --- |
| MSPP | 1 | 2 | 3 | 4 |
| 0 | Max | Max − 3 dB | Max − 4.8 dB | Max − 6 dB |
| 1 | Max | Max − 1 dB | Max − 2.8 dB | Max − 4 dB |
| 2 | Max | Max | Max − 0.8 dB | Max − 2 dB |
| 3 | Max | Max | Max | Max |

In Table 3, the term "Max" refers to maximum transmission power allocable to a terminal, and has the same meaning as the term "MAX_PWR" in Table 2. A minimum value of transmission power in Table 3 may have a value identical to that of "a" defined in Table 2.

For example, a minimum value of transmission power of a terminal which has an MSPP equal to "0" and is allocated 2 time slots may be determined as a value obtained by reducing maximum transmission output power Max by 3 dB. In this embodiment, the relevant terminal may transmit a signal by using transmission power having a minimum value of Max−3 [dB].

Equation (1) below defines an example of defining a minimum value of transmission power of a terminal based on the number n of allocated time slots.

$$\text{Max}-10\times\log 10(n) \tag{1}$$

In Equation (1), Max represents maximum transmission power of a terminal, and n represents the number of allocated time slots.

The transmission power determined as described above needs to be updated by reflecting a channel characteristic changed due to the movement of the terminal. This is because the movement of the terminal may cause a change in the channel characteristic and the change in the channel characteristic may change in the number of previously-allocated time slots and the adjustment of transmission power considering a change in the number of the previously-allocated time slots. When the change in the channel characteristic is not considered, a situation may occur in which a service is not capable of being provided to the terminal.

Figure 2:
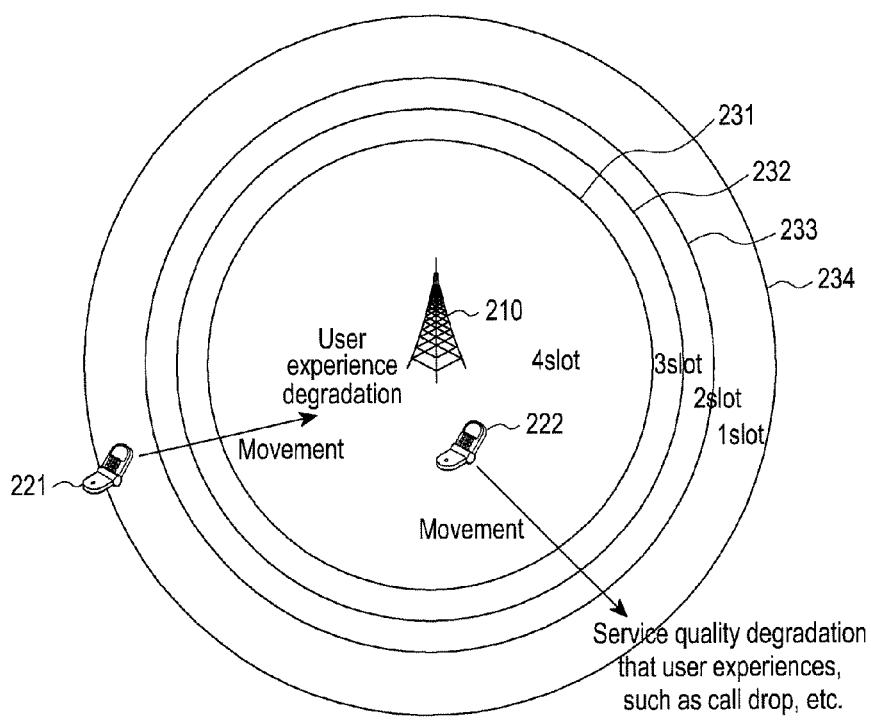
FIG. 2 illustrates examples of situations in which to propose embodiments of the present disclosure.

FIG. 2 illustrates examples of situations in which to propose embodiments of the present disclosure. In FIG. 2, only two representative situations are considered which may occur due to the movement of each terminal in a mobile communication system. For example, consideration is given to a situation in which a terminal moves in a direction toward a base station and another situation in which a terminal moves in a direction away from the base station.

Referring to FIG. 2, it is considered that a base station 210 may allocate 1 time slot through 4 time slots to each terminal in view of a channel characteristic. To this end, a service area of the base station 210 may be divided into 4 areas according to 4 reference lines (a first reference line 231, a second reference line 232, a third reference line 233, and a fourth reference line 234). The first reference line 231, the second reference line 232, the third reference line 233, and the fourth reference line 234 may be defined by an order in which the first reference line 231, the second reference line 232, the third reference line 233, and the fourth reference line 234 are away from the base station 210.

The base station 210 may allocate 4 time slots to a terminal located in a first area defined by the first reference line 231. The base station 210 may allocate 3 time slots to a terminal located in a second area defined by the first reference line 231 and the second reference line 232. The base station 210 may allocate 2 time slots to a terminal located in a third area defined by the second reference line 232 and the third reference line 233. The base station 210 may allocate one time slot to a terminal located in a fourth area defined by the third reference line 233 and the fourth reference line 234.

According to the above-described considerations, the terminal 221 moving in the direction toward the base station 210 transmits a signal by using unnecessarily-high transmission power. That the terminal 221 moving in the direction toward the base station 210 transmits a signal by using unnecessarily-high transmission power may become a cause of degradation of user experience.

In an embodiment, the terminal 221 has begun to receive a service in the fourth area, and thereby may have been initially allocated one time slot. When referring to Table 1, the terminal 221 may transmit a signal by using maximum transmission power without reduction in transmission power in the one time slot.

Even after the terminal 221 moves to the first area, the terminal 221 transmits a signal by using the initially-determined maximum transmission power. In this embodiment, the terminal 221 transmits a signal by using unnecessary transmission power, and thereby may degrade user experience.

According to the above-described considerations, the terminal 222 moving in the direction away from the base station 210 transmits a signal by using exceedingly-low transmission power. Accordingly, a situation may occur in which the terminal 222 is not capable of receiving a normal service. That is, service quality degradation that the user experiences, such as call drop, and the like, may occur.

In an embodiment, the terminal 222 has begun to receive a service in the first area, and thereby may have been initially allocated 4 time slots. When referring to Table 1, the terminal 222 may transmit a signal by using transmission power obtained by reducing maximum transmission power by 6.0 [dB] in the 4 time slots.

Even after the terminal 222 moves to the fourth area, the terminal 222 transmits a signal by using the initially-determined transmission power. In this embodiment, when considering that the fourth area is an area in which a terminal needs to transmit a signal by using maximum transmission power without reduction in transmission power, the terminal 222 transmits a signal by using exceedingly-low transmission power. In this regard, the base station 210 may not normally receive a signal transmitted by the terminal 222. That the base station 210 may not normally receive a signal transmitted by the terminal 222 may become a cause of occurrence of an out-of-service state, such as call drop and the like.

In order to efficiently use resources in a mobile communication system such as a TDMA system and the like, it is desirable to prepare a method for allocating or reallocating a time slot in view of a channel state change and adjusting transmission power according to the allocation or reallocation of a time slot. For example, when the base station allocates multislot resources to each terminal, so as to prevent the occurrence of a coverage hole according to a channel state of each terminal, adjust the number of time slots allocated to each terminal and transmission power according to the number of the time slots allocated to each terminal.

According to an embodiment of the present disclosure, the base station 210 may monitor a channel characteristic changed according to the movement of the terminal 221 from the fourth area to the first area, and may reallocate the number of time slots to the terminal 221 based on a result of the monitoring. For example, when the base station 210 monitors a channel characteristic change according to the movement of the terminal 221 from the fourth area to the third area, the base station 210 reallocates 3 time slots, the number of which has been equal to 4, to the terminal 221.

The base station 210 may monitor a channel characteristic change according to the movement of the terminal 221 from the fourth area to the first area, and may reallocate the number of time slots to the terminal 221, as expressed by 4→3→2→1. The terminal 221 may adjust transmission power thereof based on the number of reallocated time slots.

According to an embodiment of the present disclosure, the base station 210 may monitor a channel characteristic changed according to the movement of the terminal 222 from the first area to the fourth area, and may reallocate the number of time slots to the terminal 222 based on a result of the monitoring. For example, when the base station 210 monitors a channel characteristic change according to the movement of the terminal 222 from the first area to the second area, the base station 210 reallocates 2 time slots, the number of which has been equal to 1, to the terminal 222.

The base station 210 may monitor a channel characteristic change according to the movement of the terminal 222 from the first area to the fourth area, and may reallocate the number of time slots to the terminal 222, as expressed by 1→2→3→4. The terminal 222 may adjust transmission power thereof based on the number of reallocated time slots.

Each of the terminals 221 and 222 may determine transmission power in view of an MSPP thereof as well as the number of time slots allocated or reallocated by the base station 210. Table 3 shows an example of determining transmission power of a terminal by using an MSPP and the number of allocated time slots.

The base station may control transmission power of each terminal in view of the number of time slots allocated or reallocated to each terminal and an MSPP. In this embodiment, the base station allocates or reallocates the number of time slots based on a channel characteristic of each terminal or a channel characteristic change thereof, and determines transmission power of each terminal in view of the number of the time slots allocated or reallocated and an MSPP of each terminal. The base station may control each terminal to transmit a signal by using the determined transmission power.

For convenience of the following description, the maximum number of time slots allocable to one terminal will be described as being limited to 4. However, in proposed embodiments of the present disclosure, the maximum number of time slots allocable to one terminal does not have to be limited to 4. It will be obvious that the proposed embodiments of the present disclosure may be similarly applied when more than 4 time slots are allocated to one terminal.

In various proposed embodiments of the present disclosure, a base station may allocate or reallocate the number of time slots to each terminal by using an initial allocation procedure and a reallocation procedure. The base station may control transmission power of a target terminal in view of the number of time slots allocated or reallocated to the target terminal and an MSPP of the target terminal. The target terminal is capable of adjusting transmission power in view of the number of the time slots allocated or reallocated by the base station and the MSPP of the target terminal.

The initial allocation procedure defines a procedure that the base station performs in order to initially allocate the number of time slots to each terminal. The reallocation procedure defines a procedure that the base station performs in order to change the number of the time slots previously allocated to each terminal.

In the initial allocation procedure, the base station may acquire a channel quality equivalent to a channel characteristic of each terminal, and may determine the number of time slots to be allocated to each terminal based on the acquired channel quality. For example, when a channel quality MEAN_BEP satisfies a first level (≥TH_1) (i.e., MEAN_BEP≥TH_1), the base station may allocate the maximum number (i.e., 4 slots) of time slots. When the channel quality MEAN_BEP satisfies a second level (≥TH_2) and a third level (≥_TH_3), the base station may allocate the number (i.e., 3 slots or 2 slots) of time slots which is of a medium degree. When the channel quality MEAN_BEP satisfies a fourth level (≥TH_4), the base station may allocate the minimum number (i.e., one slot) of time slots. Here, a good degree of the channel quality may be defined in order of the first level, the second level, the third level, and the fourth level. That the channel quality MEAN_BEP satisfies the fourth level (≥TH_4) may signify a remaining channel quality which does not belong to either of the second level and the third level.

The base station determines whether to adjust (i.e., increase or reduce) the number of the time slots allocated to each terminal, by using the reallocation procedure. The base station may compare a quality value (i.e., a channel quality) equivalent to a channel state of each terminal with at least one preset threshold, and thereby may determine, based on a result of the comparison, whether to adjust the number of the time slots allocated to each terminal.

The base station may continuously track the channel quality of each terminal, and may determine whether to adjust the number of time slots, based on a channel quality change recognized by the tracking. The base station may previously define an adjustment requirement for determining whether to adjust the number of time slots, based on the degree of a channel quality change.

A quality value (i.e., a channel quality) equivalent to a channel state of each terminal may change due to various causes. A representative cause is due to the movement of each terminal. When it is considered that an identical wireless environment is maintained, the movement of each terminal causes a channel quality to become better in proportion to a distance between each terminal and the base station.

The base station may increase or reduce the number of the time slots allocated to each terminal by a preset adjustment value based on a result of the determination.

When a channel quality value of each terminal is less than or equal to a preset first lower limit threshold, the base station may adjust the number of time slots allocated to each terminal from the number of the currently-allocated time slots to the preset minimum number of time slots. This adjustment is performed in order to prevent the occurrence of a coverage hole by rapidly improving a channel quality when the channel quality is suddenly degraded.

When the channel quality value of each terminal exceeds the first lower limit threshold but is less than or equal to a second lower limit threshold, the base station may reduce the number of the time slots allocated to each terminal by one. For example, the base station allocates 3 time slots to a terminal allocated 4 time slots, allocates 2 time slots to a terminal allocated 3 time slots, and allocates one time slot to a terminal allocated 2 time slots.

When the channel quality value of each terminal is greater than or equal to a preset upper limit threshold, the base station may increase the number of the time slots allocated to each terminal by one. In this embodiment, the base station allocates 2 time slots to a terminal allocated one time slot, allocates 3 time slots to a terminal allocated 2 time slots, and allocates 4 time slots to a terminal allocated 3 time slots.

The reallocation procedure may be repeatedly performed in a particular cycle by the base station.

The closer each terminal, which has been allocated a predetermined number of time slots by using the above-described initial allocation or reallocation procedure, gets to the base station, the more time slots each terminal is allocated by using the reallocation procedure. In contrast, as each terminal gets farther from the base station, each terminal is allocated a smaller number of time slots than the predetermined number of the time slots previously allocated by using the reallocation procedure.

The number of allocated time slots is adaptively increased or reduced as described above, so that a telephone call inability or user experience can be improved which may occur in each terminal.

The base station needs to be able to acquire a channel quality of each terminal during the initial allocation procedure and the reallocation procedure.

During the initial allocation procedure, the base station may acquire a channel quality from a Packet Resource Request (PRR) message that the base station receives in order to identify the capability of each terminal by using a UL call connection procedure. Each terminal may include channel quality information (e.g., a MEAN_BEP value) in a PRR message, and may transmit the PRR message including the channel quality information to the base station. The MEAN_BEP value may be an uncoded bit error probability.

The MEAN_BEP value may be information which designates one of blocks previously defined in order to distinguish between channel qualities. A block designated by a MEAN_BEP value among the previously-defined blocks implies that an uncoded bit error probability becomes lower and a channel quality becomes better as the designated block gets higher. In an embodiment, the designated block implies that the larger the MEAN_BEP value, the higher a Carrier to INterference Ratio (CINR) whereas the smaller the MEAN_BEP value, the lower a CINR.

Table 4 below defines Range of 10 g 10 (actual BEP) representing a range of a maximum output power reduction value matched to each block and a minimum reduction value min and a maximum reduction value max in the range, when an uncoded bit error probability MEAN_BEP is previously defined as block 32.

TABLE 4

| MEAN_BEP | Range of log10(actual BEP) | Range of actual BEP min | max |
|---|---|---|---|
| MEAN_BEP_0 | >−0.60 | NA | 0.2511886 |
| MEAN_BEP_1 | −0.7--−0.6 | 0.251188643 | 0.1995262 |
| MEAN_BEP_2 | −0.8--−0.7 | 0.199526231 | 0.1584893 |
| MEAN_BEP_3 | −0.9--−0.8 | 0.158489319 | 0.1258925 |

TABLE 4-continued

| MEAN_BEP | Range of log10(actual BEP) | Range of actual BEP min | max |
|---|---|---|---|
| MEAN_BEP_4 | −1 − −0.9 | 0.125892541 | 0.1 |
| MEAN_BEP_5 | 1.1 − −1 | 0.1 | 0.0794328 |
| MEAN_BEP_6 | −1.2 − −1.1 | 0.079432823 | 0.0630957 |
| MEAN_BEP_7 | −1.3 − −1.2 | 0.063095734 | 0.0501187 |
| MEAN_BEP_8 | −1.4 − −1.3 | 0.050118723 | 0.0398107 |
| MEAN_BEP_9 | −1.5 − −1.4 | 0.039810717 | 0.0316228 |
| MEAN_BEP_10 | −1.6 − −1.5 | 0.031622777 | 0.0251189 |
| MEAN_BEP_11 | −1.7 − −1.6 | 0.025118864 | 0.0199526 |
| MEAN_BEP_12 | −1.8 − −1.7 | 0.019952623 | 0.0158489 |
| MEAN_BEP_13 | −1.9 − −1.8 | 0.015848932 | 0.0125893 |
| MEAN_BEP_14 | −2 − −1.9 | 0.012589254 | 0.01 |
| MEAN_BEP_15 | −2.1 − −2 | 0.01 | 0.0079433 |
| MEAN_BEP_16 | −2.2 − −2.1 | 0.007943282 | 0.0063096 |
| MEAN_BEP_17 | −2.3 − −2.2 | 0.006309573 | 0.0050119 |
| MEAN_BEP_18 | −2.4 − −2.3 | 0.005011872 | 0.0039811 |
| MEAN_BEP_19 | −2.5 − −2.4 | 0.003981072 | 0.0031623 |
| MEAN_BEP_20 | −2.6 − −2.5 | 0.003162278 | 0.0025119 |
| MEAN_BEP_21 | −2.7 − −2.6 | 0.002511886 | 0.0019953 |
| MEAN_BEP_22 | −2.8 − −2.7 | 0.001995262 | 0.0015849 |
| MEAN_BEP_23 | −2.9 − −2.8 | 0.001584893 | 0.0012589 |
| MEAN_BEP_24 | −3 − −2.9 | 0.001258925 | 0.001 |
| MEAN_BEP_25 | −3.1 − −3 | 0.001 | 0.0007943 |
| MEAN_BEP_26 | −3.2 − −3.1 | 0.000794328 | 0.000631 |
| MEAN_BEP_27 | −3.3 − −3.2 | 0.000630957 | 0.0005012 |
| MEAN_BEP_28 | −3.4 − −3.3 | 0.000501187 | 0.0003981 |
| MEAN_BEP_29 | −3.5 − −3.4 | 0.000398107 | 0.0003162 |
| MEAN_BEP_30 | −3.6 − −3.5 | 0.000316228 | 0.0002512 |
| MEAN_BEP_31 | <−3.60 | 0.000251189 | NA |

During the reallocation procedure, the base station may predict a channel quality by using a channel quality in DL that each terminal periodically reports.

Figure 3:
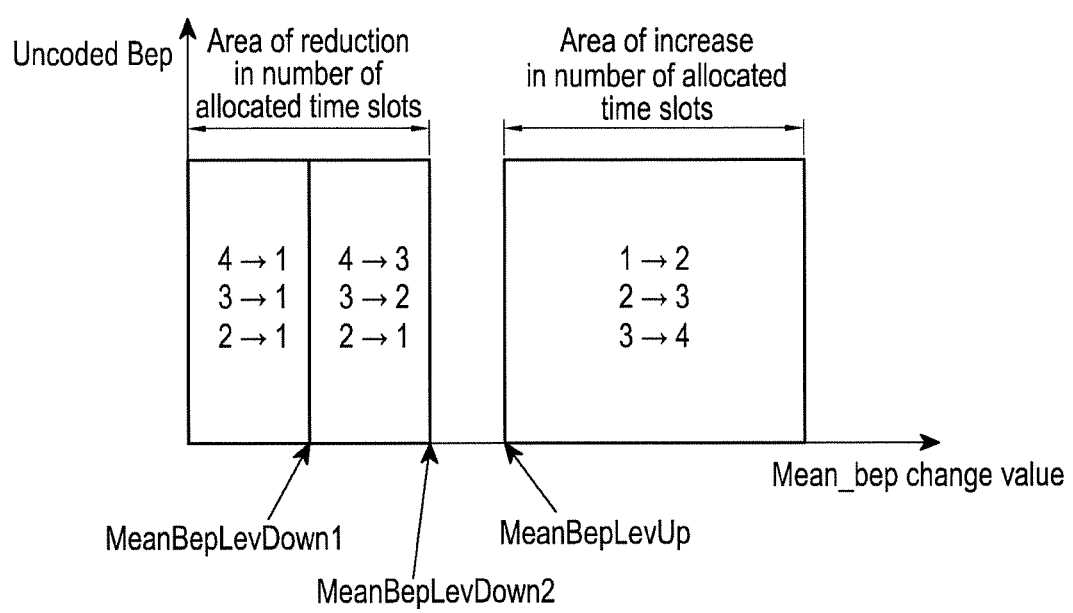
FIG. 3 illustrates an example in which a base station adjusts a time slot allocated based on a preset time slot adjustment requirement according to embodiments of the present disclosure.

FIG. 3 illustrates an example in which a base station adjusts an allocated time slot according to embodiments of the present disclosure. The time slot may be allocated based on a preset time slot adjustment requirement.

Referring to FIG. 3, the x-axis represents a change value according to an increase or reduction in MEAN_BEP, and the y-axis represents an uncoded BEP.

The Base station compares a MEAN_BEP with each of a MeanBepLevDown1, a MeanBepLevDown2 and a MeanBepLevUp which represent thresholds previously set based on the time slot adjustment requirement, and determines whether to adjust the number of time slots, based on a result of the comparison. When adjusting the number of time slots, the base station may determine, based on a result of the comparison, how many time slots are to be reduced or increased.

The base station compares a change value of an EstAvgMeanBepLev representing a measured Mean Bep level, which is an acquired channel state MEAN_BEP, with preset thresholds. The preset thresholds may be defined as a MeanBepLevDown1 representing a first lower limit MEAN_BEP level threshold, a MeanBepLevDown2 representing a second lower limit MEAN_BEP level threshold, and a MeanBepLevUp representing an upper limit MEAN_BEP level threshold.

According to an embodiment of the present disclosure, when a result of the comparison shows that a change value of the EstAvgMeanBepLev is less than the MeanBepLevDown2, the base station determines that a current state becomes poor, and reduces the number of allocated time slots. When the change value of the EstAvgMeanBepLev is less than the MeanBepLevDown2 but is greater than the MeanBepLevDown1, the base station reduces the number of the initially-allocated time slots by only one. For example, the base station may reduce the number of time slots to be allocated, as expressed by 4→3, by 3→2, or by 2→1.

When the change value of the EstAvgMeanBepLev is less than even the MeanBepLevDwon1, the base station may determine that a current channel state becomes suddenly poor. Accordingly, the base station may reduce, to one, the number of time slots to be allocated.

According to an embodiment of the present disclosure, when the change value of the EstAvgMeanBepLev is greater than the MeanBepLevUp, the base station may determine that the channel state becomes good. In this embodiment, the base station may increase the number of the initially-allocated time slots by one. For example, the base station may increase the number of allocated time slots, as expressed by 1→2, by 2→3, or by 3→4.

After adjusting the number of allocated time slots, the base station may determine optimal transmission power for each terminal in view of the adjusted number of the allocated time slots. The base station may determine a transmission power adjustment value of each terminal based on the optimal transmission power determined for each terminal. The transmission power adjustment value may be a reduction amount or an increase amount of transmission power. When the base station determines transmission power for each terminal, the base station may additionally consider an MSPP supported by each terminal.

Figure 4:
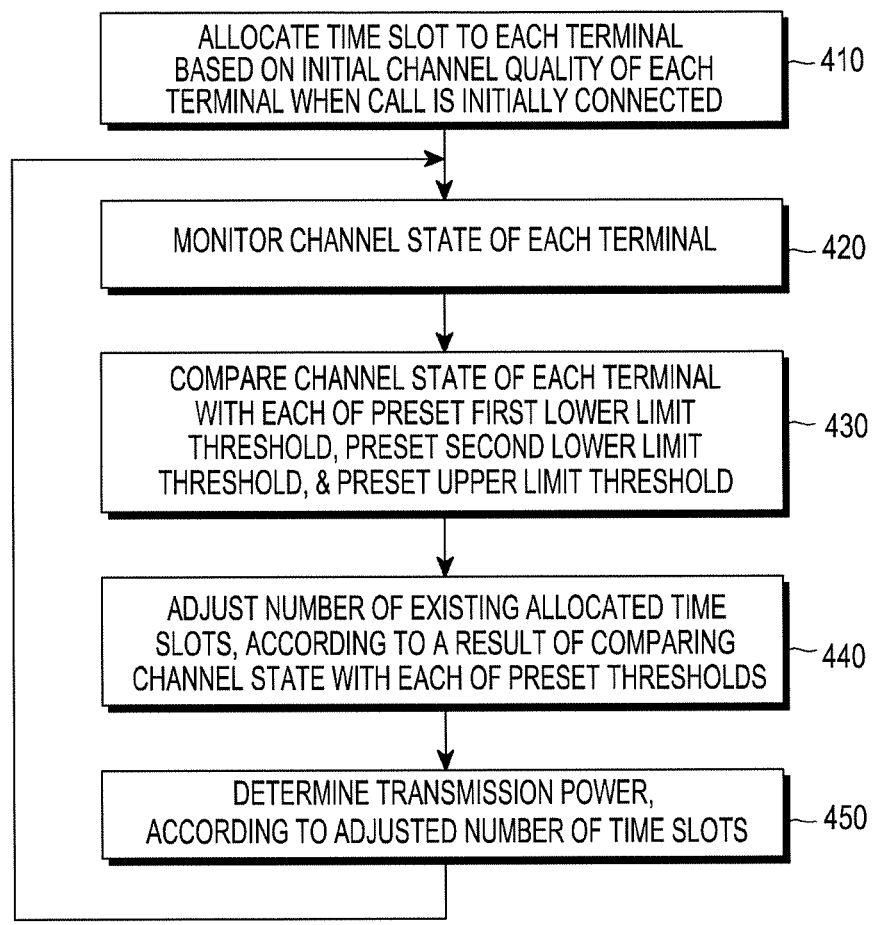
FIG. 4 illustrates a process of the flow of control performed by a base station according to embodiments of the present disclosure.

FIG. 4 illustrates a process of the flow of control performed by a base station according to embodiments of the present disclosure. The flow of control illustrated in FIG. 4 may be divided into an initial allocation procedure (operation 410) performed by the base station and a reallocation procedure (operations 420 through 450) performed by the base station.

Referring to FIG. 4, in operation 410, the base station initially allocates a time slot based on a channel quality of each terminal. For example, the initial allocation of a time slot may be performed in response to an initial attempt that each terminal makes to connect a call to the base station.

When the base station makes a UL-2-phase connection, the base station may receive a PRR message in one time slot. The PRR message may include the capability of each terminal, a MEAN_BEN value equivalent to channel quality information, and the like. The base station may identify a channel quality of each terminal based on the MEAN_BEN value included in the received PRR message.

The base station may determine the number of initial time slots to be allocated to each terminal, based on the identified channel quality of each terminal. For example, when the channel quality of each terminal is very good, the base station allocates a maximum number (i.e., 4) of time slots to each terminal. When the channel quality of each terminal is of a medium degree, the base station allocates 2 or 3 time slots to each terminal. When the channel quality is poor, the base station allocates a minimum number (i.e., 1) of time slots to each terminal.

For example, when a MEAN_BEP value satisfies a first level (≥TH_1) (i.e., MEAN_BEP≥TH_1), the base station may allocate 4 time slots. When the MEAN_BEP value satisfies a second level (≥TH_2), the base station may allocate 3 time slots. When the MEAN_BEP value satisfies a third level (≥TH_3), the base station may allocate 2 time slots. When the MEAN_BEP value does not satisfy the third level (≥TH_3), the base station may allocate one time slot. A good degree of the channel quality may be defined in order of the first level, the second level, and the third level.

After the base station allocates the initial time slot to each terminal, in operation 420, the base station monitors a channel state of each terminal. For example, the base station may monitor the channel state of each terminal based on feedback information from each terminal. Alternatively, the base station may monitor the channel state of each terminal based on a channel quality actually measured in UL. The base station may monitor the channel state of each target terminal in a set cycle.

In operations 430 and 440, the base station may adjust the number of the initial time slots or the number of time slots allocated in a previous cycle, based on the channel state of each terminal identified through the monitoring. In operations 430, the base station compares the channel state (i.e., a MEAN-BEP value) of each terminal identified through the previous monitoring, with each of preset thresholds (i.e., a first lower limit threshold MeanBepLevDown1, a second lower limit threshold MeanBepLevDown2, and an upper limit threshold MeanBepLevUp). In operation 440, the base station may adjust the number of the existing allocated time slots, based on whether a result of the comparison satisfies a predetermined condition. Herein, the adjustment of the number of time slots corresponds to an increase or a reduction in the number of the existing allocated time slots, and may include the reallocation of an adjusted number of time slots.

The adjustment corresponding to the reduction in the number of the existing allocated time slots is applied to only a situation of allocating resources equivalent to two or more multiple time slots. For example, when it is determined that a MEAN_BEP is less than or equal to each of the MeanBepLevDown1 and the MeanBepLevDown2 representing particular thresholds and thus a channel quality is degraded, the base station may reduce the number of the existing allocated time slots. The reduction of the number of the existing allocated time slots increases transmission power of each terminal, and thereby can improve a channel quality.

In an embodiment, the base station calculates an EstAvgMeanBepLev representing an average MEAN_BEP value during a predetermined period. The predetermined period during which the average MEAN_BEP value is to be calculated may be previously set by an agreement.

When the average MEAN_BEP value EstAvgMeanBepLev is less than the first lower limit threshold MeanBepLevDown1, the base station reduces the number of the existing allocated time slots to the minimum number of time slots regardless of the number of the existing allocated time slots. For example, when the minimum number of time slots is equal to 1, the base station reduces the number of the existing allocated time slots, which is equal to one of 4, 3 and 2, to 1 which is equal to the minimum number of time slots. This reduction operation is performed in order to prevent the occurrence of a coverage hole by rapidly improving a channel quality when the channel quality is suddenly degraded.

When the average MEAN_BEP value EstAvgMeanBepLev is less than the second lower limit threshold MeanBepLevDown2, the base station reduces, by one, the number of the existing allocated time slots. It is desirable to set the second lower limit threshold MeanBepLevDown2 to a larger value than the first lower limit threshold MeanBepLevDown1. For example, when the number of the existing allocated time slots is equal to 4, if the average MEAN_BEP value EstAvgMeanBepLev is less than the second lower limit threshold MeanBepLevDown2, the base station adjusts the number of allocated time slots from 4 to 3.

The adjustment corresponding to the increase in the number of the existing allocated time slots may be performed when the average MEAN_BEP value EstAvgMeanBepLev is greater than or equal to the upper limit threshold MeanBepLevUp. That the average MEAN_BEP value EstAvgMeanBepLev is greater than or equal to the upper limit threshold MeanBepLevUp signifies an improvement in the channel quality of each relevant terminal. For example, when it is determined that the average MEAN_BEP value EstAvgMeanBepLev is greater than the upper limit threshold MeanBepLevUp, the base station increases the number of the existing allocated time slots by one, and thereby can improve a service quality.

In operation 450, the base station may determine transmission power of each terminal in view of the adjusted number of time slots. The base station may determine transmission power of each terminal in inverse proportion to the adjustment of the number of time slots. For example, when the number of time slots increases, the base station may reduce transmission power of each terminal. In contrast, when the number of time slots is reduced, the base station may increase the transmission power of each terminal.

The base station may adjust transmission power matched to the number of the allocated time slots, by using Table 1 and Table 3.

The operations in FIG. 4 as described above may be repeatedly performed in a particular cycle.

Figure 5:
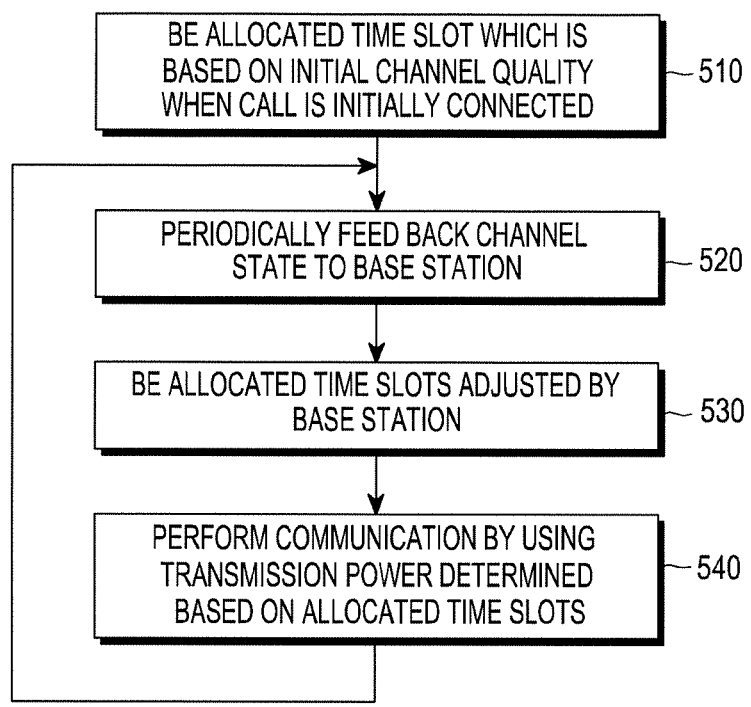
FIG. 5 illustrates a process of the flow of control performed by a terminal according to embodiments of the present disclosure.

FIG. 5 illustrates a process of the flow of control performed by a terminal according to embodiments of the present disclosure. The flow of control illustrated in FIG. 5 may be divided into an initial allocation procedure (operation 510) performed by each terminal and a reallocation procedure (operations 520 through 540) performed by each terminal.

Referring to FIG. 5, in operation 510, when each terminal initially connects a call to the base station, each terminal is allocated a time slot which is based on an initial channel quality. In operation 520, each terminal periodically monitors a channel state in DL, and feeds back a channel quality according to the motoring to the base station.

In operation 530, each terminal is allocated time slots, the number of which has been adjusted based on the channel quality reported to the base station. In operation 540, each terminal communicates with the base station by using transmission power appropriate for the number of the allocated time slots.

Figure 6:
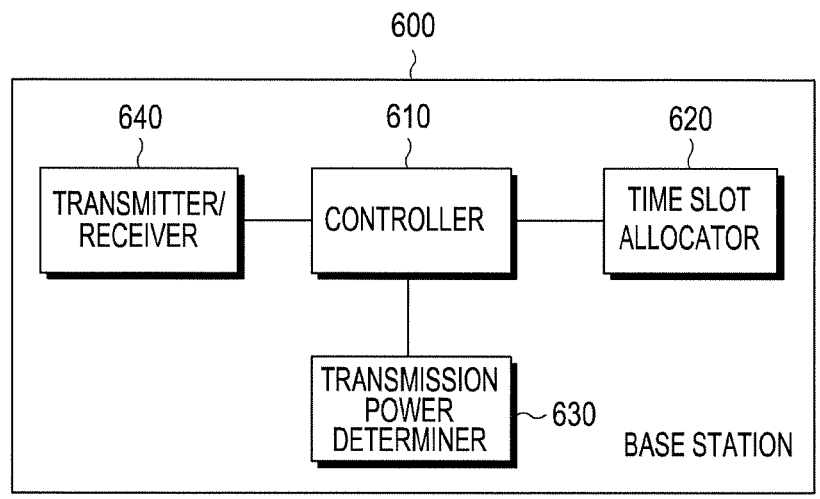
FIG. 6 illustrates a block diagram showing a configuration of a base station according to embodiments of the present disclosure.

FIG. 6 illustrates a block diagram showing a configuration of a base station according to embodiments of the present disclosure.

Referring to FIG. 6, the base station 600 includes a transmitter/receiver 640, a controller 610, a time slot allocator 620, and a transmission power determiner 630.

The transmitter/receiver 640 receives information on a channel quality from each terminal, and delivers the received information on the channel quality to the controller 610. The transmitter/receiver 640 transmits, to each terminal, information on time slots, the number of which has been initially allocated under the control of the controller 610, or time slots, the number of which has been changed under the control of the controller 610. The transmitter/receiver 640 may transmit, to each terminal, information on transmission power determined in view of the number of the time slots initially allocated or changed under the control of the controller 610.

The controller 610 controls an overall operation for determining or changing the number of time slots to be allocated to each terminal in view of a channel quality of each terminal.

The controller 610 determines the number of time slots to be initially allocated based on an initial channel quality of each terminal provided through the transmitter/receiver 640, and performs control according to an initial allocation procedure for allocating the time slots, the number of which has been determined.

The controller 610 determines the number of time slots to be changed based on the channel quality of each terminal periodically provided through the transmitter/receiver 640, and performs control according to a reallocation procedure for allocating the time slots, the number of which has been determined.

The controller 610 compares the channel quality of each terminal with each of preset thresholds, and determines, based on a result of the comparison, whether it is necessary to adjust the number of the previously allocated time slots. For example, the controller 610 may perform a control operation for increasing or reducing the number of time slots to be allocated. The controller 610 may perform a control operation in such a manner as to distinguish an operation for reducing, at once, the number of time slots to be allocated to the minimum number of time slots from another operation for reducing, by one, the number of time slots to be allocated. When increasing the number of time slots to be allocated, the controller 610 may control an operation by increasing, by one, the number of time slots to be allocated.

When the number of initially-allocated time slots or the number of time slots to be adjusted has been determined, the controller 610 provides the time slot allocator 620 and the transmission power determiner 630 with the determined number of the initially-allocated time slots or the determined number of the time slots to be adjusted.

The time slot allocator 620 allocates, to each target terminal, the time slots, the number of which has been determined by the controller 610. Examples of the number of time slots which has been determined by the controller 610 may include the number of time slots which has been determined by the initial allocation of time slots, and the number of time slots which has been determined by the reallocation of time slots.

The time slot allocator 620 may request the transmitter/receiver 640 to provide each target terminal with information on the time slots allocated to each target terminal.

The transmission power determiner 630 determines transmission power of each target terminal in view of the number of the time slots which has been determined by the controller 610. For example, the transmission power determiner 630 may determine optimal transmission power based on the number of the time slots to be allocated to each target terminal, by using Table 1 or Table 3. The transmission power determiner 630 may request the transmitter/receiver 640 to provide each target terminal with information on the determined transmission power.

Figure 7:
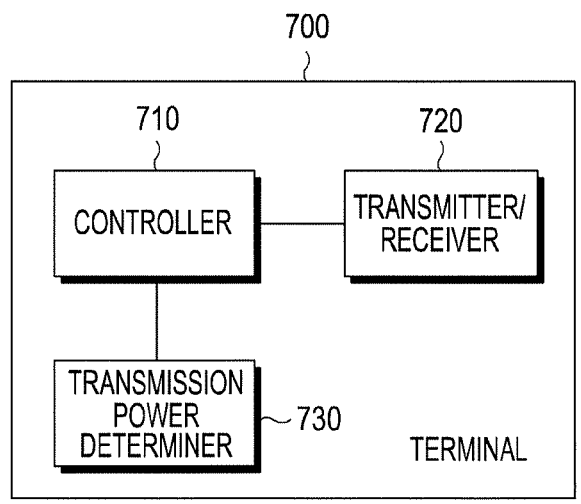
FIG. 7 illustrates a block diagram showing a configuration of a terminal according to embodiments of the present disclosure.

FIG. 7 illustrates a block diagram showing a configuration of a terminal according to embodiments of the present disclosure.

Referring to FIG. 7, the terminal 700 may include a controller 710 and a transmitter/receiver 720. When the terminal 700 determines transmission power in view of the number of time slots allocated by the base station, the terminal 700 may additionally include a transmission power determiner 730. Even when transmission power is determined by the base station but information on the determined transmission power is not provided by the base station, the transmission power determiner 730 needs to be included in the terminal 700.

Under the control of the controller 710, the transmitter/receiver 720 may provide the base station with information on an initial channel quality or a periodically-measured channel quality. The transmitter/receiver 720 receives a signal transmitted by the base station, and delivers the received signal to the controller 710. The signal that the transmitter/receiver 720 receives and delivers to the controller 710 may include information on the number of the initially-allocated time slots or the number of the reallocated time slots. The signal delivered to the controller 710 may include information on optimal transmission power matched to the number of allocated time slots.

The controller 710 performs an overall control operation for transmitting a signal by using transmission power determined based on the time slots, the number of which has been initially allocated or has been reallocated. The transmission power for transmitting a signal may be set based on the information provided by the base station or determined by the transmission power determiner 730.

In order to allow the transmission power determiner 730 to determine transmission power, the controller 710 needs to provide the transmission power determiner 730 with the information on the number of time slots provided by the base station. The transmission power determiner 730 determines the transmission power to be used by the transmitter/receiver 720, in consideration of the number of the allocated time slots provided by the controller 710.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for allocating a time slot to a terminal by a base station of a wireless communication system supporting a time division multiple access scheme, the method comprising:
    monitoring a channel state of the terminal after determining a number of time slots to be assigned to the terminal;
    adjusting, by increasing or reducing, the determined number of time slots when the channel state of the terminal satisfies a preset time slot adjustment requirement; and
    determining a transmission power for the terminal based on the adjusted number of time slots.

2. The method as claimed in claim 1, further comprising acquiring an initial channel quality of the terminal and allocating at least one time slot for the terminal based on the acquired initial channel quality when a call is initially connected to the terminal.

3. The method as claimed in claim 1, wherein adjusting the determined number of time slots:
    determining whether to adjust a number of existing allocated at least one time slot by comparing a quality value equivalent to the channel state of the terminal with at least one preset threshold; and
    increasing or reducing the determined number of time slots by a preset adjustment value based on a result of the determination.

4. The method as claimed in claim 1, wherein adjusting the determined number of time slots to be assigned to the terminal comprises:
    adjusting a number of existing allocated at least one time slot to a preset minimum number of at least one time slot when a quality value equivalent to the channel state of the terminal is less than or equal to a preset first lower limit threshold;

reducing the number of the existing allocated at least one time slot by one when the quality value equivalent to the channel state of the terminal exceeds the preset first lower limit threshold but is less than or equal to a preset second lower limit threshold; and increasing the number of the existing allocated at least one time slot by one when the quality value equivalent to the channel state of the terminal is greater than or equal to a preset upper limit threshold.

5. The method as claimed in claim 1, wherein monitoring the channel state of the terminal is repeatedly performed in a preset cycle.

6. The method as claimed in claim 1, wherein determining the transmission power, by using a terminal that is to transmit a signal in each time slot, in view of the adjusted number of time slots.

7. The method as claimed in claim 6, wherein determining the transmission power comprises:

reducing the transmission power, by using the terminal that is to transmit the signal in the each time slot, in proportion to an increased number of at least one time slot when the adjusted number of time slots are greater than a number of existing allocated at least one time slot; and increasing the transmission power, by using the terminal that is to transmit the signal in each of the at least one time slot, in proportion to a reduced number of the at least one time slot when the adjusted number of the at least one time slot is less than the number of the existing allocated at least one time slot.

8. The method as claimed in claim 6, further comprising: transmitting, to the terminal, information on the adjusted number of time slots and the determined transmission power.

9. A base station for allocating a time slot to a terminal in a wireless communication system supporting a time division multiple access scheme, the base station comprising:

a receiver configured to receive a signal from the terminal in at least one time slot allocated to the terminal; and a controller configured to monitor a channel state of the terminal after determining a number of time slots to be assigned to the terminal, increase or reduce the determined number of time slots when the channel state of the terminal satisfies a preset time slot adjustment requirement, and determine a transmission power for the terminal based on the adjusted number of time slots.

10. The base station as claimed in claim 9, wherein the controller configured to acquire an initial channel quality of the terminal and allocate at least one time slot for the terminal based on the acquired initial channel quality when a call is initially connected to the terminal.

11. The base station as claimed in claim 9, wherein the controller is configured to determine whether to adjust a number of existing allocated at least one time slot by comparing a quality value equivalent to the channel state of the terminal with at least one preset threshold, and increase or reduce the determined number of time slots by a preset adjustment value based on a result of the determination.

12. The base station as claimed in claim 9, wherein the controller is configured to adjust a number of existing allocated at least one time slot to a preset minimum number of at least one time slot when a quality value equivalent to the channel state of the terminal is less than or equal to a preset first lower limit threshold; reduces the number of the existing allocated at least one time slot by one when the quality value equivalent to the channel state of the terminal exceeds the preset first lower limit threshold but is less than or equal to a preset second lower limit threshold; and increases the number of the existing allocated at least one time slot by one when the quality value equivalent to the channel state of the terminal is greater than or equal to a preset upper limit threshold.

13. The base station as claimed in claim 9, wherein the controller is configured to repeatedly perform the monitoring of the channel state of the terminal in a preset cycle.

14. The base station as claimed in claim 9, wherein the controller is configured to determine transmission power, by using a terminal that is to transmit a signal in each time slot, in view of the adjusted number of time slots.

15. The base station as claimed in claim 14, wherein the controller is configured to reduce the transmission power, by using the terminal that is to transmit the signal in the each time slot, in proportion to an increased number of at least one time slot when the adjusted number of time slots is greater than a number of existing allocated at least one time slot; and increase the transmission power, by using the terminal that is to transmit the signal in each of the at least one time slot, in proportion to the reduced number of the at least one time slot when the adjusted number of the at least one time slot is less than the number of the existing allocated at least one time slot.

16. The base station as claimed in claim 14, further comprising a transmitter configured to transmit information on the adjusted number of time slots and the determined transmission power to the terminal under control of the controller.

17. A wireless communication system supporting a time division multiple access scheme for allocating a time slot to a terminal, comprising:

a base station comprising a transceiver configured to receive a signal from the terminal in at least one time slot allocated to the terminal; and one or more processors configured to monitor a channel state of the terminal after determining a number of time slots to be assigned to the terminal, increase or reduce the determined number of time slots when the channel state of the terminal satisfies a preset time slot adjustment requirement, and determine a transmission power for the terminal based on the adjusted number of time slots.

18. The wireless communication system as claimed in claim 17, wherein the one or more processors are configured to acquire an initial channel quality of the terminal and allocate at least one time slot for the terminal based on the acquired initial channel quality when a call is initially connected to the terminal.

19. The wireless communication system as claimed in claim 17, wherein the one or more processors are configured to determine whether to adjust a number of existing allocated at least one time slot by comparing a quality value equivalent to the channel state of the terminal with at least one preset threshold, and increase or reduce the determined number of time slots by a preset adjustment value based on a result of the determination.

20. The wireless communication system as claimed in claim 17, wherein the one or more processors are configured to adjust a number of existing allocated at least one time slot to a preset minimum number of at least one time slot when a quality value equivalent to the channel state of the terminal is less than or equal to a preset first lower limit threshold; reduces the number of the existing allocated at least one time slot by one when the quality value equivalent to the channel state of the terminal exceeds the preset first lower limit threshold but is less than or equal to a preset second lower limit threshold; and increases the number of the existing allocated at least one time slot by one when the quality value equivalent to the channel state of the terminal is greater than or equal to a preset upper limit threshold.

* * * * *